United States Patent [19]
Beaver et al.

[11] Patent Number: 5,230,879
[45] Date of Patent: Jul. 27, 1993

[54] REDUCTION OF METAL HALATES AND RECOVERY OF METAL HALIDES

[75] Inventors: Phillip R. Beaver, Baton Rouge, La.; Bonnie G. McKinnie, Magnolia, Ark.

[73] Assignee: Ethyl Corporation, Richmond, Va.

[21] Appl. No.: 827,334

[22] Filed: Jan. 29, 1992

[51] Int. Cl.$^5$ .................. C01D 3/00; C01F 11/20; C01F 5/26

[52] U.S. Cl. .................. 423/491; 423/499.1; 423/497; 423/499.2; 423/499.3; 423/499.4

[58] Field of Search .............. 423/497, 499, 473, 491, 423/475, 499.1, 499.2, 499.3, 499.4

[56] References Cited

U.S. PATENT DOCUMENTS

| | | | |
|---|---|---|---|
| 964,156 | 8/1909 | Graves et al. | 423/499 |
| 2,269,733 | 1/1942 | Pearson | 23/87 |
| 2,828,184 | 3/1958 | Behrman | 23/85 |
| 3,085,854 | 4/1963 | Meybeck et al. | 423/473 |
| 3,431,068 | 3/1969 | Burk | 23/89 |
| 3,592,600 | 7/1971 | Platz | 23/216 |
| 3,823,225 | 7/1974 | Sprague | 423/478 |
| 4,083,942 | 4/1978 | Sanders | 423/497 |
| 4,104,424 | 8/1978 | Steinbrecher et al. | 427/435 |
| 4,111,991 | 9/1978 | Garrison | 260/583 P |
| 4,248,850 | 2/1981 | Keblys | 423/491 |
| 4,514,374 | 4/1985 | Kirsch | 423/497 |
| 4,549,973 | 10/1985 | Kirsch | 252/8.55 R |
| 4,620,969 | 11/1986 | Wilkinson | 423/421 |
| 4,990,321 | 2/1991 | Sato et al. | 423/486 |

FOREIGN PATENT DOCUMENTS

| | | | |
|---|---|---|---|
| 473399 | 11/1972 | Japan. | |
| 0311866 | 3/1970 | U.S.S.R. | 423/497 |

OTHER PUBLICATIONS

W. J. Masschelein, Chlorine Dioxide Chemistry and Environmental Impact of Oxychlorine Compounds, 1979, p. 120.

Primary Examiner—Gary P. Straub
Assistant Examiner—Valerie Lund
Attorney, Agent, or Firm—David E. LaRose

[57] ABSTRACT

This invention relates to a process for reducing metal halates to metal halides, the process comprising reacting a metal halate with a reducing agent in an aqueous alkaline reaction medium having a pH above about 7, wherein the amount of reducing agent is sufficient to reduce substantially all of the metal halate to metal halide.

21 Claims, No Drawings

REDUCTION OF METAL HALATES AND RECOVERY OF METAL HALIDES

BACKGROUND OF THE INVENTION

This invention relates to a novel process for the reduction of metal halates in aqueous alkaline solutions. More specifically, the invention relates to a process for decreasing the amount of metal bromate in aqueous alkaline solutions and recovering valuable metal bromide from such aqueous alkaline solutions. For example, in a scrubber system for the removal of halogens from process vent streams, an aqueous alkaline solution is generally used as a scrubbing medium. Minimizing the bromate content allows the use of low cost materials of construction, eliminates the potential for release of hazardous materials and achieves high bromide purity in the recovered product.

The potential to form halates is known. The literature reports the formation of halate when a halogen and a basic metal compound react. Metal halides result when a basic metal compound and a reducing agent react with a halogen. Ammonium halide results when ammonia reacts with a halogen.

The preparation of metal halide from a basic metal compound and a halogen in the presence of a reducing agent is well known in the art. Acidic conditions are reported, and the reaction conditions are such as to inhibit the formation of halates. In the absence of a reducing agent, a halogen compound reacts with a metal base in two steps, forming the hypohalide, which then tends to decompose to the halate. For example, U. S. Pat. No. 2,828,184 reports:

$$3 I_2 + 6 KOH \rightarrow 3 KI + 3 KIO + 3 H_2O \tag{1}$$

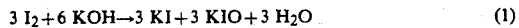

$$3 KIO \rightarrow KIO_3 + 2 KI \tag{2}$$

However, when a reducing agent is included in the reaction with the halogen, formation of the halate is prevented.

U.S. Pat. No. 4,514,374 discloses preparation of aqueous metal bromide solution without the concurrent production of bromate by reaction of calcium hydroxide, bromine and methanol in aqueous solution. The reaction is depicted as follows:

$$3 Ca(OH)_2 + 3 Br_2 + CH_3OH \rightarrow 3 CaBr_2 + CO_2 + 5 H_2O \tag{3}$$

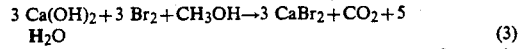

In this process, only a stoichiometric amount of base is used, not excess base nor strongly alkaline reaction conditions.

Other patent literature cites the use of ammonia, ammonium ion, or amines to form the halide directly from halogen. For example, the reaction with $NH_3$ can be written as follows:

$$3 Br_2 + 8 NH_3 \rightarrow 6 NH_4Br + N_2 \tag{4}$$

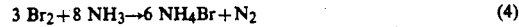

This reaction sequence is not without significant drawbacks including: 1) formation of explosive compounds such as halo amines as a by-product; and 2) significant loss of ammonia to vent streams.

Numerous examples of reducing agents are known in the prior art. For example, U.S. Pat. No. 2,269,733 discloses the use of ammonia, ammonium hydroxide, ammonium bromide, urea, formic acid, oxalic acid, ammonium carbonate, ammonium bicarbonate, and formamide as well as other metal oxides, hydroxides and carbonates. However, a small amount of free bromine is maintained during substantially the entire course of the reaction to form sodium bromide while the pH of the reaction is maintained below pH 7.

In U.S. Pat. No. 3,431,068 there is disclosed a method of preparing alkali metal halides by reacting an alkali metal hydroxide with an elemental halogen in a liquid, saturated aliphatic or alicyclic alcohol or ketone, or a saturated aliphatic aldehyde. According to this process, the formation of unwanted halate salt by-product associated with alkali metal halide production is diminished or eliminated. It is also disclosed that the use of nitrogen containing compounds such as $NH_4Br$ can result in explosive mixtures. The alcohol, aldehyde and ketone mentioned in this reference are not employed as reducing agents but as solvents and are present in large excess. Use of alcohols or ketones as reaction medium for scrubbing vent streams is prohibited by the emission losses that would occur.

U.S. Pat. No. 4,083,942 discloses the use of formic acid as a reactant. The process is illustrated by the following equation:

$$Ca(OH)_2 + HCOOH + Br_2 \rightarrow CaBr_2 + CO_2 + 2 H_2O \tag{5}$$

In the foregoing process, bromine and an alkaline compound are alternatively and incrementally added to an aqueous mixture of formic acid and a less than equivalent amount of metal compound, while maintaining the pH below 7.0.

U.S. Pat. No. 3,592,600 relates a process for the recovery of bromine and/or iodine from the reaction products of oxydehydrogenations of hydrocarbons in which bromine and/or iodine serves as a catalyst. The reaction product leaving the reactor, primarily hydrogen halide with some elementary halogen, is treated with an aqueous ammonia solution to which has been added an amount of hydrazine sufficient for the reduction of the elementary halogen. The aqueous phase is separated and the by-products containing bromine and/or iodine separated in the working up of the organic phase are burned with oxygen containing gases and the gas from the combustion is scrubbed with an ammonia solution containing hydrazine. However, this process also suffers the drawback mentioned above wherein explosive halo amines are formed.

Amine halide is prepared by reaction of an amine with a metal base and a halide in solvent. For example, lithium carbonate, hydrazine and iodine react in water, as is disclosed by U.S. Pat. No. 4,111,991. Reaction conditions are maintained at pH 4.5 to 7.0.

Japanese Patent. No. 47-3399 recites reaction of $Br_2$ with aqueous NaOH to generate sodium bromide and sodium bromate, as in reactions (1) and (2) above. Excess bromine is used in the reaction with caustic, leaving the pH of the solution at less than 7.0. The resulting bromate is then reduced using sulfurous anhydride, stannous chloride, metallic zinc, formic acid, hydroxylamine, hydroquinone, phenylhydrazine, hydrated hydrazine or the like. However, $SO_4$, Cl, etc., or impurities generated in the reduction may be admixed and their removal is difficult resulting in products with extremely low purity. This reference also teaches the treating of a mixed solution of sodium bromide and sodium bromate with formic acid in an amount equal to or less than the theoretical amount needed to reduce the sodium bromate at less than 40° C. Then, hydrogenated hydrazine is added to bring the solution to a pH of 1 or lower. The solution is subsequently concentrated, neutralized, filtered and heated to about 120° C. While this procedure may help prevent the unwanted formation of sodium formate, the strongly acidic conditions which it employs prevents its use in alkaline scrubber systems such as those taught in this invention.

In U.S. Pat. No. 4,248,850, it was disclosed that metal bromides could be prepared by contacting in an aqueous medium a basic metal compound and bromine in the presence of added formaldehyde as a reducing agent. However, this method suffers from the draw-back of leaving unreacted formaldehyde in the product mixture which is difficult to remove. Also, acidic reaction conditions are used.

Thus the prior art for limiting halate accumulation falls into two classes: 1) metal hydroxides and a reducing agent in neutral to acidic conditions reacting with halogen whereby the formation of halate is inhibited, and 2) ammonia, ammonium ion, or amines reacting with halogen or halate to form halide. There remains a need to reduce halates under strongly basic conditions, for example at pH>10 and preferably at pH>13, whereby valuable by-products are recovered and the formation of explosive compounds is inhibited.

The strongly basic reduction conditions are important in certain operations. For example, in scrubber systems for scrubbing bromine from process vent streams, caustic solution containing sodium bromide are maintained for long periods of time. Sodium bromate tends to accumulate in the scrubber solution. In such systems, if bromate content is allowed to accumulate, the solution becomes very corrosive. Also, if spent scrubber solution is disposed of, sodium bromate creates a disposal hazard since acidification will release bromine and any uncontrolled reaction with certain compounds, such as amines, could lead to explosive mixtures. When using a reducing agent such as methanol in a scrubber system for removing halogens from process vent streams, it is desirable to use less than a stoichiometric amount of methanol to reduce the halates and to perform such reduction with the vent streams diverted from the scrubber. This reduces the potential to emit methanol in the vent gases, and to form methyl bromide.

It is therefore an object of this invention to reduce metal halates to metal halides in solutions which are strongly basic. It is another object of this invention to reduce the amount of corrosive bromate produced from the reaction of bromine and metal hydroxide or metal carbonate in vent streams by adding a reducing agent to a scrubber solution. It is a further object of this invention to recover substantially pure metal halide or metal halide solution from such scrubber solutions in order to conserve valuable raw materials.

THE INVENTION

Thus, this invention relates to a process for reducing metal halates to metal halides which comprises reacting a metal halate with a reducing agent in an aqueous alkaline reaction medium having a pH above about 7 wherein the amount of reducing agent is sufficient to reduce substantially all of the metal halate to metal halide.

This invention also relates to a process for reducing the amount of residual halate in an scrubber system and recovering metal halide, the process comprising reacting halogen with an aqueous alkaline scrubbing solution and adding, either periodically or continuously, a reducing agent wherein the amount of reducing agent is sufficient to convert substantially all of the halate to halide and subsequently recovering the metal halide product. For the purposes of this invention, the term "substantially all" means that from about 0 wt. % to about 0.5 wt. % halate based on the total weight of the aqueous alkaline reaction medium plus halate remains unreacted. Thus, in both embodiments, a minor amount of halate is left unreacted so as to insure the complete conversion of the reducing agent. In another embodiment, the minor amount of halate remaining in the aqueous alkaline reaction medium is reacted with sufficient additional reducing agent, preferably hydrazine, in order to convert the minor amount of halate to halide.

Without being bound by theory, it is believed that the reaction of halogen (X) in nitrogen rich vent streams, utilizing a strong alkaline scrubber solution, and methanol as a reducing agent may be illustrated as follows. During scrubbing of a nitrogen vent stream:

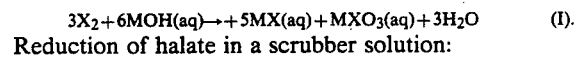

Reduction of halate in a scrubber solution:

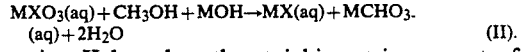

In reaction II less than the stoichiometric amount of methanol is normally used. Sufficient methanol is added periodically or continuously to eliminate essentially all of the residual halate according to Reaction II, and then HX is added to release $CO_2$ and to recover additional MX.

Removal of residual halate:

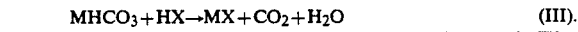

wherein M is an alkaline or alkaline earth metal. The limitation of residual halate in process streams aids in the inhibition of corrosion of steel process equipment.

The metal halates referred to in this invention include $NaBrO_3$, $NaClO_3$, $NaIO_3$, $MgClO_3$, $MgBrO_3$, $MgIO_3$, $KBrO_3$, $KClO_3$, $KIO_3$, and the like. Preferably the metal halate is an alkali metal halate and most preferably $NaBrO_3$. One way that these halates may be formed is in situ in a scrubber system; however, halates may be formed in any alkaline process stream which contains a halogen and an alkaline reaction medium. In the context of a scrubber system, halate concentration is maintained within the range of from 0 wt. % to about 2 wt. %, preferably from about 0.05 wt. % to about 0.5 wt. %, and most preferably from about 0.1 wt. % to about 0.3 wt. % by reducing a portion of the halate after it is formed.

The halogens referred to in this invention include $Br_2$, $Cl_2$, and $I_2$. Likewise, the halides referred to in this invention include chloride, bromide, and iodide and the halates include chlorate, bromate, and iodate. Bromine, bromide, and bromate are the preferred forms.

The reducing agents which can be employed in this invention include alkanols of from 1-8 carbon atoms, $H_2O_2$, hydrazine, hydrazine hydrate, urea, hydrogen, formaldehyde, carbon, sulfur dioxide, and ($C_1$-$C_5$-)polyhydroxyalcohols, such as ethylene glycol. The preferred reducing agent is methanol due to its low cost and ease of handling. When used in a scrubber system, the reducing agent is typically added periodically to the aqueous alkaline medium in an amount less than the stoichiometric amount required to reduce all of the halate formed during the scrubbing operations. During the addition of the reducing agent, it may be desirable to divert the vent streams from the scrubber system so as to ensure that the reducing agent is reacting with the halate in the scrubbing solution and not reacting with the incoming halogen in the vent stream and also to prevent loss of the reducing agent. Alternatively, part of the soluble solution may be isolated for reaction with reducing agent. When periodically added to the scrubbing solution, the reducing agent is preferably added all at once, but it may be added incrementally over a period of time such that the heat of reaction is controlled. When methanol is used as a reducing agent, the amount of methanol is preferably within the range of from about 0.5 mole to about 2.0 moles per mole of halate, most preferably 0.95 to 1.05 moles per mole of halate.

The aqueous alkaline reaction medium can be any of the alkaline or alkaline-earth metal hydroxides and carbonates, such as NaOH, $Na_2CO_3$, $Mg(OH)_2$, $MgCO_3$, $Ca(OH)_2$, $CaCO_3$, KOH, $K_2CO_3$ and the like. The preferred reaction medium is aqueous NaOH. In the context of a scrubber system, from about 15 wt. % to about 30 wt. % NaOH solution is charged to the scrubber system to provide a sufficient scrubbing medium.

The pH range of the aqueous alkaline reaction medium is a critical feature of this invention. The pH must be maintained above 7 in order to insure that free halogen is not released from the scrubbing medium. Preferably, the pH is maintained within the range of from about 9.0 to about 14.0; most preferably within the range of from about 10.0 to about 13.5. However, corrosive halate is formed as a by-product of the reaction of a base, such as NaOH, with residual halogen which may be present in the process streams. According to the present invention, a reducing agent such as methanol may be added under strongly basic reaction conditions in order to reduce substantially all of the halate to halide, thus essentially eliminating the formation of free halogen.

The temperature and pressure of the reaction are not critical. Generally, the temperatures may range from about 0° C. to about 90° C., with temperatures within the range of from 15° C. to 60° C. being preferred. Likewise, the pressures employed during the reaction may vary widely. Suitably, these pressures may range from about 0.07 KPa to about 10 KPa or more, with pressures of from about 1 KPa to about 2 KPa being most preferred.

For the purposes of this invention, the term scrubber system is used to identify any means of gas absorption whereby one or more of the constituents of a gas mixture, in this case nitrogen and minor amounts of free halogen, may be dissolved or absorbed in a circulating liquid scrubbing medium, in this case an aqueous alkaline reaction medium comprising either alkaline or alkaline-earth metal hydroxides or carbonates, for the purposes of gas purification and product recovery. The gas absorption is typically carried out in a vertical countercurrent column wherein the aqueous alkaline reaction medium is fed into the top of the column and the gas mixture is introduced into the bottom of the column. As the gas mixture travels upward through the column, it contacts and reacts with the downward travelling aqueous alkaline reaction medium. The reaction medium collects in the lower part of the column or in a separate circulation tank where it can be recirculated to the top of the column.

The column may be packed, plate or a simple spray column. Packed columns generally comprise a shell filled with a packing material designed to disperse the liquid an bring it into close contact with the rising gas mixture. Solubility of the absorbed gas and rate of mass transfer as well as many practical details must be considered during design and construction of such scrubber columns. Alternately, a contactor (packed column, Venturi scrubber, or in-line scrubber, or combinations of the same) with co-current flow, can be used. Those skilled in the art are familiar with design and construction techniques of scrubbers and scrubber systems.

For the purpose of this invention, the term process stream is used to identify any liquid or gaseous stream propelled through equipment lines used to transport reagents or products in industrial scale reactions.

A preferred use of this invention is in the reduction of the amount of bromate in aqueous solutions to inhibit the corrosion of process lines and storage vessels, with the added benefit of recovering saleable NaBr or NaBr solution. In practice, a scrubber solution comprising metal hydroxide or metal carbonate is available for scrubbing bromine from vent streams and process streams. However, bromate concentration increases during the course of this reaction. Occasionally, process vent streams containing bromine may be diverted and a small amount of reducing agent may be added. Thus, bromate concentration is maintained at a substantially low level. Corrosion of process lines and storage vessels is dramatically decreased. There is essentially no loss of reducing agent in vent streams from the scrubber system, nor is there substantial formation of methyl bromide.

The reaction of the preferred embodiment can be illustrated as follows:

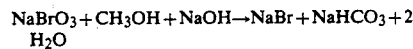

In the applications where it is advantageous to recover the spent scrubber solution, additional processing might be required, depending on the reducing agent and product quality. For example, HBr could be added to the scrubber solution, provided that the pH of the solution is not allowed to fall below about 7.0, in order to convert $NaHCO_3$ to NaBr and $CO_2$, when methanol is the reducing agent. The HBr also converts any residual NaOH to NaBr.

The following examples illustrate a process for converting bromine and sodium bromate in a scrubber system to sodium bromide at a pH within the range of from about 10.0 to about 13.5.

EXAMPLE I

A 2000 gal. volume of 25 wt. % caustic solution is charged to a scrubber system and process streams containing bromine are vented through the scrubber and circulating scrubber solution at ambient temperature and pressure. Initially, the amount of bromate in the scrubber solution increases to about 0.6 wt. % at 23.5 wt. % caustic and about 2.5 wt. % sodium bromide is formed. At this point, the vent stream is diverted and about 2.8 pounds of methanol (0.1 mole methanol per mole bromate) is added to the scrubber solution in one minute. Thus, sufficient methanol is added to convert part of the bromate to bromide, while maintaining a residual bromate content at about 0.5 wt. %. With resumed scrubbing, the bromate content again increases to 0.6 wt. %. Then scrubbing is interrupted for another methanol addition. With extended use, the caustic content of the system reduces to about 1 wt. % and the sodium bromide content increases to >32 wt. %. The small amount of bromate is maintained in the system to assure complete conversion of the methanol in the desired reaction. If sodium bromide is to be recovered when the scrubber solution is spent, additional methanol can be added to reduce the bromate content to about 0.05 wt. % or less. Then, HBr is added to convert NaHCO and residual caustic to sodium bromide at a pH of about 7.0. The final solution contains about 43 wt. % NaBr.

EXAMPLE II

A 2000 gal. volume of 25 wt. % caustic solution is charged to a scrubber system and process streams containing bromine are vented through the scrubber and circulating scrubber solution at ambient temperature and pressure. Initially, the amount of bromate in the scrubber solution increases to about 1.6 wt. % at 21 wt. % caustic and about 5.4 wt. % sodium bromide is formed. At this point, the vent stream is diverted and about 50 pounds of methanol is added to the scrubber solution in ten minutes. Thus, sufficient methanol is added to convert part of the bromate to bromide, while maintaining a residual bromate content at about 0.5 wt. %. With resumed scrubbing, the bromate content again increases to 1.6 wt. %. Then scrubbing is interrupted for another methanol addition. With extended use, the caustic content of the system reduces to about 1 wt. %. Recovery of NaBr follows procedures as used in Example 1.

The following examples illustrate another feature of this invention.

EXAMPLE III

To a strongly basic solution containing 0.49 wt. % sodium bromate, 2.29 wt. % sodium bromide and about 13 wt. % NaOH was added 6.23 g of hydrazine monohydrate solution (0.82 wt. % hydrazine, confirmed by HPLC). The amount of nitrogen formed was quantitatively measured as 28.45 g. Without being bound by theory, it is believed that the reduction of sodium bromate to bromide (with nitrogen gas evolution) may be illustrated as follows:

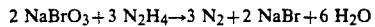

$$2\ NaBrO_3 + 3\ N_2H_4 \rightarrow 3\ N_2 + 2\ NaBr + 6\ H_2O$$

The hydrazine content of the reagent solution was 115 wt. % of the theoretical requirement to reduce the sodium bromate to sodium bromide (with nitrogen gas evolution) according to the above reaction. The reaction proceeded to completion within 30 seconds. The volume of gas evolved was 43.82 mL and was determined to be nitrogen with traces of water vapor by GC/MS. The experimental volume of gas was 112% of the expected theoretical value of 39.28 mL. The bromate present after reaction was measured to be 63 ppm (a 98.4% conversion). The bromide content increased from 2.29 wt. % as sodium bromide before reaction to 2.78 wt. % after reaction. No hydrazine was found in the sample after the reaction.

EXAMPLE IV

To 120 g of a field sample containing 15.5% NaOH, 10.2% NaBr, and 1.5% $NaBrO_3$ was added 4.75 g methanol at ambient temperature. The sample color changed from yellowish to water-white in about 5 minutes at ambient temperature. The reacted sample was analyzed, and the result was 34 ppm $NaBrO_3$.

What is claimed is:

1. A process for reducing metal halates to metal halides, said process comprising reacting a metal halate with a reducing agent, selected from the group consisting of alkanols having from 1 to 8 carbon atoms, $H_2O_2$, hydrazine, hydrazine hydrate, sulfur dioxide and $(C_1-C_5)$polyhydroxyalcohols, in an aqueous alkaline reaction medium having a pH within the range of from about 9.0 to about 14.0 wherein the reducing agent is sufficient to reduce substantially all of said metal halate to metal halide.

2. The process of claim 1 wherein said aqueous alkaline reaction medium is selected from the group consisting of alkaline and alkaline-earth metal hydroxides and carbonates.

3. The process of claim 1 wherein said metal halate is $NaBrO_3$.

4. The process of claim 1 wherein said pH of said mixture is within the range of from about 10.0 to about 13.5.

5. The process of claim 1 wherein said metal halate is selected from the group consisting of $NaBrO_3$, $Mg(BrO_3)_2$, $KBrO_3$, and $Ca(BrO_3)_2$.

6. The process of claim 5 wherein said reducing agent is methanol.

7. The process of claim 5 wherein said reducing agent is methanol and the amount of said reducing agent is within a range of from 0.95 mole to 1.05 mole per mole of halate.

8. The process of claim 5 wherein said reducing agent is methanol and the amount of said reducing agent is within a range of from about 0.5 mole to about 2.0 moles per mole of halate.

9. The process of claim 8 wherein said pH of said mixture is within the range of from about 10.0 to about 13.5.

10. The process of claim 9 wherein said aqueous alkaline reaction medium is selected from the group consisting of alkaline or alkaline-earth metal hydroxides and carbonates.

11. A process for reducing the amount of residual halate in a scrubber system and recovering metal halide, said process comprising reacting halogen with an aqueous alkaline scrubbing solution, forming halate as a by-product, and adding a reducing agent, selected from the group consisting of alkanols having from 1 to 8 carbon atoms, $H_2O_2$, hydrazine, hydrazine hydrate, sulfur dioxide and $(C_1-C_5)$ polyhydroxyalcohols, to said aqueous alkaline scrubbing solution while maintaining a scrubbing solution pH within the range of from about 9.0 to about 14.0, wherein the amount of reducing agent is sufficient to convert substantially all of said halate to halide and subsequently recovering said metal halide product.

12. The process of claim 11 wherein said metal halide is selected from the group consisting of NaBr, $MgBr_2$, KBr, and $CaBr_2$.

13. The process of claim 11 wherein said halate is bromate.

14. The process of claim 11 wherein said halogen is bromine.

15. The process of claim 11 wherein said reducing agent is methanol.

16. The process of claim 11 wherein said reducing agent is methanol in an amount within the range of from about 0.5 mole to about 2.0 moles per mole of halate.

17. The process of claim 11 wherein said reducing agent is methanol in an amount within the range of from 0.95 mole to 1.05 mole per mole of halate.

18. The process of claim 11 wherein said aqueous alkaline scrubbing solution is selected from the group consisting of alkaline and alkaline-earth metal hydroxides and carbonates.

19. The process of claim 11 wherein said aqueous alkaline scrubbing solution has a pH range of from about 10.0 to about 13.5.

20. The process of claim 11 wherein said aqueous alkaline scrubbing solution is an aqueous NaOH solution.

21. The process of claim 20 wherein said aqueous NaOH solution has a pH range of from about 10.0 to about 13.5.

* * * * *